United States Patent [19]

Cobb

[11] 4,239,571

[45] Dec. 16, 1980

[54] METHOD FOR MAKING A COMPOSITE STRUCTURE

[75] Inventor: A. Lawrence Cobb, Rochester, Mich.

[73] Assignee: Composite Technology Corporation, Troy, Mich.

[21] Appl. No.: 954,704

[22] Filed: Oct. 25, 1978

[51] Int. Cl.³ .................. B32B 31/12; B32B 31/20
[52] U.S. Cl. .................. 156/196; 156/289; 156/295; 156/310; 156/313; 156/307.3; 264/304; 428/311; 428/315
[58] Field of Search .......... 264/264, 265, 304, 338, 264/257, 321; 156/182, 196, 289, 295, 308–310, 313

[56] References Cited

U.S. PATENT DOCUMENTS

| | | | |
|---|---|---|---|
| 3,193,437 | 7/1965 | Schafer | 428/311 |
| 3,257,266 | 6/1966 | Sapper | 264/265 |
| 3,867,221 | 2/1975 | Chant | 428/311 X |
| 4,034,137 | 7/1977 | Hofer | 428/315 X |
| 4,042,746 | 8/1977 | Hofer | 428/315 X |
| 4,157,416 | 6/1979 | Cobb | 428/420 X |

Primary Examiner—George F. Lesmes
Assistant Examiner—Alexander S. Thomas
Attorney, Agent, or Firm—Reising, Ethington, Barnard, Perry & Brooks

[57] ABSTRACT

A method of forming a layered composite material of the type formed under heat and low pressure and to one outer surface of which a protective thermosetting polymer is bonded.

5 Claims, 2 Drawing Figures

METHOD FOR MAKING A COMPOSITE STRUCTURE

TECHNICAL FIELD

The present invention relates to a method of forming a layered composite material of the type formed under heat and low pressure and to one outer surface of which a protective thermosetting polymer is bonded.

More specifically, the invention relates to the method of forming a composite material which includes providing a first layer of originally open-cell, resilient foam impregnated with a first non-cured thermosetting resin system; a second and adjacent layer of originally open-cell and resilient foam impregnated with a second non-cured thermosetting resin system; the non-adjacent or outer surfaces of which foam layers are overlaid with respective fibrous reinforcing layers; one reinforced foam layer including a discrete outer protective non-cured resin layer; compressing the foam layers to fill substantially all the open cells with its respective resin system and embedding the adjacent reinforcing layers; and simultaneously curing all resins while maintaining the foam layers under compression.

While the use of protective outer layers such as gel coats for certain types of composite plastic materials is well known, there are various problems which have arisen with such coated composites which are avoided by the present invention.

"Gel coat" is a generic expression for high molecular weight, thermosetting polymers such as polyester, epoxy, or urethane resins. A gel coat may be used for cosmetic purposes, e.g. smooth finish, as the outer surface of a composite material. For example, it is common to make fiberglass reinforced boat hulls by beginning with a female mold which is first covered with a gel coat and thereafter alternate layers of fiberglass mat and resin are laid into the mold to the appropriate thickness and the resin allowed to cure at ambient temperature. Since heat is not used in this process it is slow. Next, inasmuch as no molding pressure is used there is often difficulty in achieving strong bond strength between the outer gel coat and the underlying reinforced plastic.

On the other hand, high pressure composite molding processes give rise to different problems as they seek to incorporate an outer gel coat layer. In forming composites wherein molding pressures are involved, it is necessary to utilize mold-release materials to facilitate the removal of the composite structures from the mold without damage to the part. Normally, the mold-release material is applied to the mold surface before the composite materials are introduced for molding. Such are referred to as "external" mold-release compounds or materials. However, where high pressure molding processes are used in molding plastic composite parts, the resin is forced to flow parallel to the mold surface thereby shearing off mold-release material applied externally to a mold. For example, in molding composite parts of Sheet Molding Compound (SMC), molding pressures of at least 1,000 to 2,000 psi are utilized. To overcome the shearing-off of an externally applied mold-release material, an "internal" mold-release material is incorporated as a homogeneous part of the resin system. While facilitating the removal of the part from the mold, the presence of the internal mold-release material throughout the composite material creates a bond or adhesion problem, particularly if an outer gel coat is to be applied to one surface of the composite.

Also, due to the presence of high shearing forces in the laterally flowing resin which accompanies high molding pressure processes, such as SMC, normally available gel coats are not useable. As with the external mold-release materials, normal gel coats tend to be sheared off the mold surface thereby resulting in an unsatisfactory outer gel coat surface. Certain high tensile strength gel coats have been developed for use in high pressure molding such as in making SMC parts. Such high tensile strength gel coats are on the order of twice as expensive as normal gel coats thereby adding significantly to the cost of the resultant product. Likewise, the need to incorporate an internal mold-release material with an SMC or high pressure molded part inevitably reduces the bond strength between the protective or gel coat and the SMC substrate.

In utilizing a basic material which includes an initially resilient and open-cell foam impregnated with a thermosetting resin and overlaid with a reinforcing layer such as a fiberglass mat, products made in accordance with the present invention are molded with heat and under low pressure in the range of 20–150 psi, enabling, first, the use of conventional low tensile strength gel coats and, second, elimination of an internal mold-release material at the interface of the gel coat and the sub-adjacent reinforced foam layer thereby resulting in improved adhesion of the gel coat to the composite substrate.

BACKGROUND ART

Schafer U.S. Pat. Nos. 3,193,437 and 3,193,441, as well as Chant U.S. Pat. No. 3,867,221, illustrate the concept of an initially open-cell foam material impregnated with a thermosetting resin used alone or in combination with reinforcing fibers, and wherein the foam layer is compressed under relatively low pressure such that the thermosetting resin substantially fills the cells of the foam and which resin is cured while maintaining the resilient foam layer in a compressed condition.

Also of interest is applicant's copending application U.S. Ser. No. 902,590, filed May 4, 1978, now U.S. Pat. No. 4,157,416 wherein a composite structure is formed utilizing different resin compositions which, while contemporaneously cured, remain in that discrete layer of the open-cell foam material to which they are introduced and do not flow into an adjacent resin impregnated foam layer during the compression and curing process.

To the best of applicant's knowledge and experience, it has been the preferred practice to incorporate an internal mold-release material in those resin systems where a composite structure is formed under heat and pressure.

DISCLOSURE OF THE INVENTION

While otherwise useful, internal mold-release materials incorporated with thermosetting resin systems degrade or weaken the adhesion or bond strength possible with an overlaid resin gel coat. Accordingly, the present invention is directed to the method of maximizing the adhesion or bond strength between a reinforced and layered plastic substrate and an overlaid gel coat by eliminating mold-release material at the interface between such substrate and gel coat.

More specifically, the method of the present invention comprises (A) forming a layered composite structure including (1) impregnating a first initially open-cell, resilient foam layer with a first thermosetting resin system, (2) impregnating a second initially open-cell resilient foam layer with a second resin system, (3) placing said first and second resin-impregnated foam layers in an overlaid and abutting relationship, and (4) overlaying the outer and non-abutting surfaces of each foam layer with a fibrous reinforcing material; (B) providing a first mold member, (1) coating a surface of said mold member with a mold-release material, (2) coating said mold-release covered mold surface with a non-cured, thermosetting gel coat; (C) placing the layered composite structure upon said first mold part so that one reinforced foam layer rests upon said non-cured gel coat; (D) moving a second mold member against the other reinforced foam layer so as to compress said foam layers; and (E) simultaneously curing the resins in said first and second resin systems and said gel coat while maintaining said foam layers in a compressed condition.

BEST MODE FOR CARRYING OUT THE INVENTION

Figure 1:
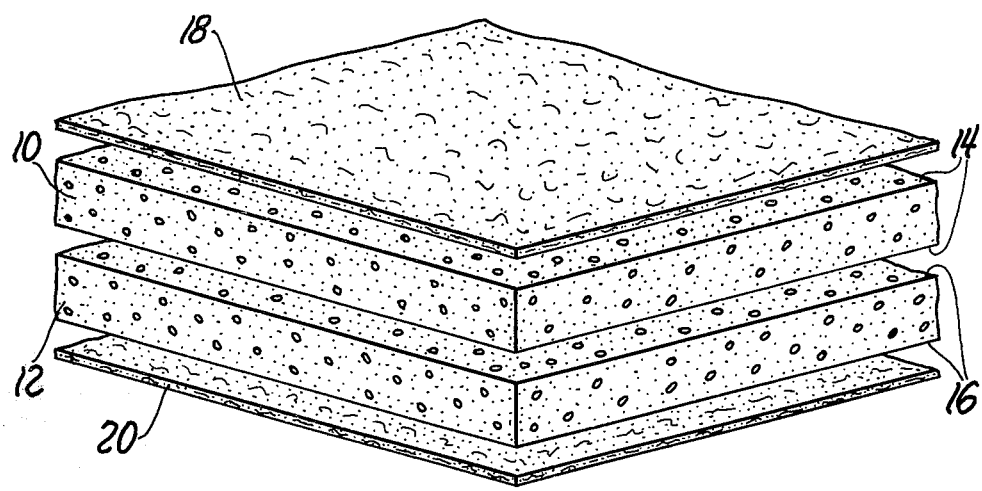
FIG. 1 illustrates the components of a layered composite structure prior to placing in a mold.

Referring to the drawings, the method of forming a composite structure having a firmly bonded resinous gel coat on one outer surface will now be described. The basic materials used to form the composite structure include first and second layers of resilient and open-cell foam materials 10 and 12.

In referring to the open-cell character of the resilient foam layers 10 and 12 is meant that in general at least 85% of the foam cells are in open communication with adjacent cells. It has been found that a flexible or resilient polyurethane foam is highly satisfactory for practice with the subject invention. However, other open-cell resilient foams may be used so long as they are chemically compatible with other resins used in making the composite structure.

The open cells of foam layers 10 and 12 may be considered as reservoirs for the liquid thermosetting resins with which each layer is impregnated.

First and second thermosetting resins 14 and 16 are respectively applied to foam layers 10 and 12. During a subsequent compression operation, the resins are adapted to fill substantially all of the open cells of the respective foam layers. The resilient foam layers may be impregnated or otherwise coated with the liquid resin in any well-known fashion such as by dipping, being run through a resin bath and thereafter passed between squeezing rolls to control the amount of resin retained within the foam layer, or gravure roll coated.

Depending upon compatibility with the other composite materials, available cure time, physical strength requirements in the reinforcing layer and cost, a variety of satisfactory polymerizable resin systems may be used to impregnate the open-cell foam layers 10 and 12. It is highly satisfactory with the present invention to utilize vinylester, polyester, or epoxy resins for impregnating purposes.

As taught in my copending application, U.S. Ser. No. 902,590 filed May 4, 1978, it is also possible to use different resin systems in each of the foam layers since it has been discovered that such different resin systems do not flow into or mix with each other except along a very thin boundary layer at the interface of the foam layers. For example, in the aforesaid copending application it is taught that one foam layer may be impregnated with a polyester resin based system and the other foam layer impregnated with an epoxy based resin system. Likewise, it is taught in such copending application that the resin systems may have the same resin base, e.g. polyester, and differ only in pigmentation wherein the resultant composite will have the color of one pigment in one half thereof and the color of the other pigment in the other half thereof. In other words, the ingredients of each resin system remain in that foam layer to which they are originally introduced and do not flow into the other foam layer during the compression and molding process.

It is preferred pressure molding practice today to incorporate mold-release materials in such resin systems wherever possible to facilitate the removal of a formed and cured part from the mold. When used in this way, that is, incorporated into the resin system, it is referred to as an "internal" mold-release material in contrast to applying it directly to the mold surface, in which case it is referred to as an "external" mold-release material.

Zinc stearate is a typical material useful as an internal or external mold-release and may be utilized in the subject invention.

For illustrative purposes, resin systems 14 and 16 may both include a polyester resin base, an epoxy base, or one system of epoxy and the other of polyester. It is preferred, however, that the systems differ in that resin system 14 incorporates an "internal" mold-release compound, e.g. zinc stearate, therein and that, in any case, system 16 has no "internal" mold-release compound incorporated therein. The reason for this difference will be explained subsequently.

After foam layers 10 and 12 have been coated or impregnated with the respective resin system 14 and 16, the layers are placed in overlaid and preferably abutting relationship, as shown in the drawings. Next, the outer surface of each foam layer is overlaid with a reinforcing layer 18 and 20. A preferred reinforcing layer is comprised of a fibrous material such as glass fiber mats or glass woven cloth.

Figure 2:
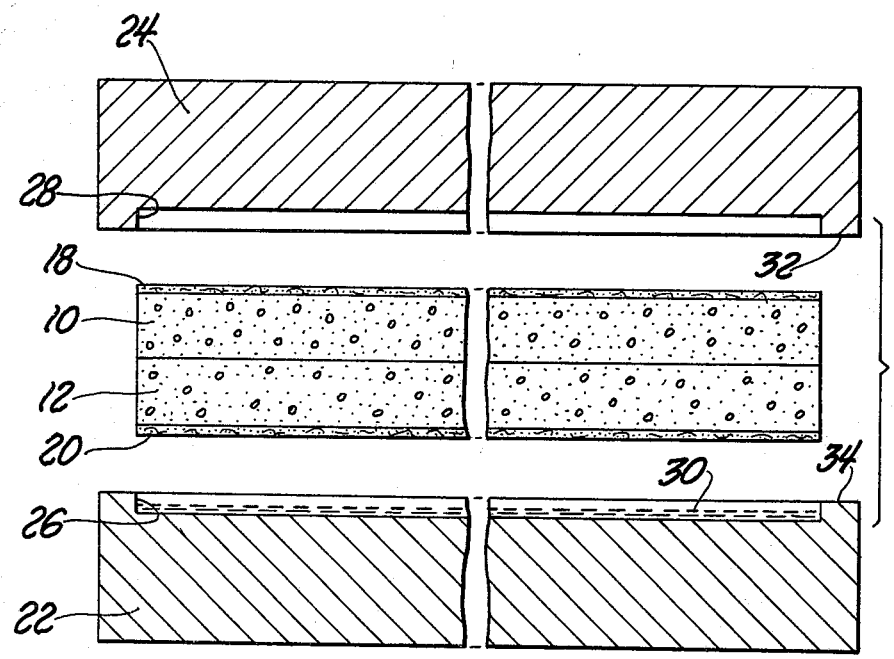
FIG. 2 represents the layered composite structure positioned between upper and lower mold members and prior to compression of the composite structure.

Referring to FIG. 2, a two-part mold is shown and includes a lower stationary mold part 22 and an upper movable mold part 24. Mold parts 22 and 24 include coacting recesses 26 and 28 in the shape of the part to be molded.

As noted, it is the purpose of the invention to create a pressure-molded composite structure with at least one surface thereof having a resin coating thereon and which outer coating has certain physical and/or chemical characteristics different from the resins in the substrate layers. Such outer or finish resin layer is applied as a so-called gel coat material which may, for example, be a polyester resin and suitable catalyst. As noted, the purpose of utilizing a discrete thermoset polymer outer surface is to enhance the usefulness of the resultant composite structure by imparting to the surface one or more special characteristics such as: pigmentation, ultraviolet stabilization; corrosion resistance; flame retardancy; or other capabilities not achievable or not conveniently achievable through the resin systems in the layered substrate.

Since separation between a composite resinous substrate and a gel coat is a common problem, it is the particular purpose of the present invention to apply such a discrete outer layer to a layered and resin-impregnated composite substrate by a method which maximizes the bond strength or adhesion of such outer layer and the substrate. Accordingly, the cavity 26 of lower mold part 22 is first coated with an exterior mold-release material such as zinc stearate. A thermosetting polymer gel coat 30, such as a polyester resin with suitable catalyst and other additives to impart the required physical or chemical characteristics as noted above, is applied over the exterior mold-release material in mold cavity 26. At this point it is to be noted that an external mold-release material is not applied to cavity 28 of upper mold part 24 since an internal mold-release material is incorporated into the resin system 14 which impregnates foam layer 10 and this layer will be disposed proximate the upper mold part cavity 28.

The composite sandwich comprising resin impregnated foam layers 10 and 12 with reinforcing layers 18 and 20 is now placed within cavity 26 of the lower mold part 22 so that reinforcing layer 20 rests upon gel coat layer 30. Upper mold part 24 is next moved into position such that upper cavity 28 is adapted to engage reinforcing layer 18. Upper mold part 24 is next moved toward lower mold part 22 thereby compressing foam layers 10 and 12 with a force of 20 to 150 psi until upper and lower mold part edges 32 and 34 are in contact thereby limiting further compression of the foam layers. During such compression, resin systems 14 and 16 are extruded so as to fill substantially all the cells of their respective foam layers and encapsulate the associated reinforcing layers.

As noted in my copending application, U.S. Ser. No. 902,590 filed May 4, 1978, during the compression step the respective resin systems flow normal to the substrate surfaces engaged by the mold, however, resin flow stops at the interface with an adjacent resin-impregnated foam layer. In other words and for reasons not completely understood, when the foam layers are compressed resin systems 14 and 16 flow toward each other but essentially stop inward flow at the interface of the layers and mix only along a very thin layer at such interface. Thus, the integrity or composition of each resin system is maintained within the foam layer into which the resin was originally introduced and mixture of the systems and their additives is avoided.

Accordingly, the internal mold-release material incorporated in resin system 14 remains within the reinforced foam layer 10 and flows upwardly to contact mold cavity 28 to facilitate removal of the formed part from mold member 24 after curing.

While maintaining the reinforced foam layers 10 and 12 under compression, the resin systems 14 and 16 and gel coat layer 30 are polymerized through the application of heat to the mold parts until the resins are cured.

The bond strength or adhesion between resin system 16 and gel coat 30 is maximized due to several aspects of the subject molding process. First, resin system 16 may be selected so as to be chemically compatible with the gel coat; for example, both may be polyester resin based, whereas resin system 14 may provide different physical and/or chemical characteristics to the composite structure. Second, and as compared with an essentially no pressure or hand lay-up molding process, the present method in utilizing molding pressures in the 20 to 150 psi range, insures more intimate contact along the interface between the outer gel coat and the subadjacent reinforced foam layer. Third, while low to moderate molding pressure is desirable in enhancing gel coat bond strength, very high molding pressures, as used with Sheet Molding Compound, for example, create high lateral resin shear forces which have disadvantages both with respect to such bond strength and cost of materials. In this respect, such high lateral resin shear forces preclude the use of a mold-release material applied to the mold surface and such material must instead be incorporated homogeneously throughout the composite substrate resin system with the result that the mold-release material is present at the interface and thereby reduces the adhesion between the substrate and gel coat. Finally, the high lateral resin shear forces require the use of costly high tensile strength gel coat materials adding further to the overall cost of high pressure molded composites.

A further modification of the present invention for enhancing the bond strength or adhesion between the outer gel coat and a layered composite substrate comprises including the addition of an adhesive promoter, such as silane, to resin system 16. In order to achieve the complete advantage of incorporating such adhesive promoter to resin system 16 it is necessary that the mold-release material incorporated in resin system 14 be isolated from the interface between the gel coat and the subadjacent substrate resin system as occurs in the low pressure molding method of the present invention.

Other modifications are possible within the intended scope of the invention as set forth in the hereinafter appended claims.

What is claimed is:

1. The method of forming a composite structure comprising providing a first layer of open-cell, resilient foam material, impregnating said first foam layer with a first thermosetting resin system, providing a second layer of open-cell foam material, impregnating said second foam layer with a second thermosetting resin system, only said second resin system including a mold-release material incorporated therein, placing said first and second resin-impregnated foam layers in abutting relationship, overlaying each of the non-abutting surfaces of said respective foam layers with a layer of fibrous reinforcing material, providing a two-part mold, applying a mold-release material to the surface of one part of said two-part mold, applying a thermosetting gel coat over said mold-release material, placing the uncured and reinforced foam materials within the mold such that the second foam layer impregnated with the mold-release containing resin system is positioned adjacent the non-coated mold part and the first resin-impregnated foam layer is positioned adjacent the coated mold part, moving said mold parts toward each other so as to compress said foam layers whereby the open cells thereof are filled with their respective resin systems and curing said resin systems and gel coat while maintaining the foam layers in their compressed condition.

2. The method of forming a composite structure comprising providing a first layer of open-cell, resilient foam material, impregnating said first foam layer with a first thermosetting resin system, providing a second layer of open-cell foam material, impregnating said second foam layer with a second thermosetting resin system, only said second resin system including a mold-release material incorporated therein, placing said first and second resin-impregnated foam layers in abuttng relationship, overlaying each of the non-abutting surfaces of said respective foam layers with a layer of fibrous reinforcing material, providing a two-part mold, applying a mold-release material to the surface of one part of said two-part mold, applying a thermosetting gel coat over said mold-release material, placing the uncured and reinforced foam materials within the mold such that the second foam layer impregnated with the mold-release containing resin system is positioned adjacent the non-coated mold part and the first resin-impregnated foam layer is positioned adjacent the coated mold part, moving said mold parts toward each other so as to compress said foam layers with a pressure of between 20 and 50 psi whereby the open cells thereof are filled with their respective resin systems and curing said resin systems and gel coat while maintaining the foam layers in their compressed condition.

3. The method of forming a composite structure comprising providing a first layer of open-cell, resilient foam material, impregnating said first foam layer with a first thermosetting resin system, including an adhesive promoter in said first resin system, providing a second layer of open-cell foam material, impregnating said second foam layer with a second thermosetting resin system, incorporating a mold-release material in said second resin system, placing said first and second resin-impregnated foam layers in abutting relationship, overlaying each of the non-abutting surfaces of said respective foam layers with a layer of fibrous reinforcing material, providing a two-part mold, applying a mold-release material to the surface of one part of said two-part mold, applying a thermosetting gel coat over said mold-release material, placing the uncured and reinforced foam materials within the mold such that the second foam layer impregnated with the mold-release containing resin system is positioned adjacent the non-coated mold part and the first resin-impregnated foam layer is positioned adjacent the coated mold part, moving said mold parts toward each other so as to compress said foam layers whereby the open cells thereof are filled with their respective resin systems and curing said resin systems and gel coat while maintaining the foam layers in their compressed condition.

4. The method of forming a composite structure comprising providing a first layer of open-cell, resilient foam material, impregnating said first foam layer with a first thermosetting resin system, providing a second layer of open-cell foam material, impregnating said second foam layer with a second thermosetting resin system, incorporating a mold-release material in said second resin system, placing said first and second resin-impregnated foam layers in abutting relationship, overlaying each of the non-abutting surfaces of said respective foam layers with a layer of fibrous reinforcing material, providing a two-part mold, applying a mold-release material to the surface of one part of said two-part mold, applying a thermosetting gel coat over said mold-release material, placing the uncured and reinforced foam materials within the mold such that the second foam layer impregnated with the mold-release containing resin system is positioned adjacent the non-coated mold part and the first resin-impregnated foam layer is positioned adjacent the coated mold part, moving said mold parts toward each other so as to compress said foam layers with a pressure of between 20 and 50 psi whereby the open cells thereof are filled with their respective resin systems and curing said resin systems and gel coat while maintaining the foam layers in their compressed condition.

5. The method of forming a composite structure comprising providing a first layer of open-cell, resilient foam material, impregnating said first foam layer with a first thermosetting resin system, including an adhesive promoter in said first resin system, providing a second layer of open-cell foam material, impregnating said second foam layer with a second thermosetting resin system, incorporating a mold-release material in said second resin system, placing said first and second resin-impregnated foam layers in abutting relationship, overlaying each of the non-abutting surfaces of said respective foam layers with a layer of fibrous reinforcing material, providing a two-part mold, applying a mold-release material to the surface of one part of said two-part mold, applying a thermosetting gel coat over said mold-release material, placing the uncured and reinforced foam materials within the mold such that the second foam layer impregnated with the mold-release containing resin system is positioned adjacent the non-coated mold part and the first resin-impregnated foam layer is positioned adjacent the coated mold part, moving said mold parts toward each other so as to compress said foam layers with a pressure of between 20 and 50 psi whereby the open cells thereof are filled with their respective resin systems and curing said resin systems and gel coat while maintaining the foam layers in their compressed condition.

* * * * *

UNITED STATES PATENT AND TRADEMARK OFFICE
CERTIFICATE OF CORRECTION

PATENT NO. : 4,239,571
DATED : December 16, 1980
INVENTOR(S) : A. Lawrence Cobb

It is certified that error appears in the above—identified patent and that said Letters Patent is hereby corrected as shown below:

Column 7, line 12      "50" should be --150--.

Column 8, line 15      "50" should be --150--.

Column 8, line 42      "50" should be --150--.

Signed and Sealed this

Twenty-first Day of April 1981

[SEAL]

Attest:

RENE D. TEGTMEYER

Attesting Officer      Acting Commissioner of Patents and Trademarks